(12) United States Patent
Huang et al.

(10) Patent No.: US 10,593,060 B2
(45) Date of Patent: Mar. 17, 2020

(54) VISUAL POSITIONING AND NAVIGATION DEVICE AND METHOD THEREOF

(71) Applicant: TwoAntz, Inc., Santa Clara, CA (US)

(72) Inventors: Chi-Min Huang, Santa Clara, CA (US); Cheng Huang, Wuhan (CN)

(73) Assignee: TwoAntz, Inc., Santa Clara, CA (US)

( * ) Notice: Subject to any disclaimer, the term of this patent is extended or adjusted under 35 U.S.C. 154(b) by 25 days.

(21) Appl. No.: 15/487,461

(22) Filed: Apr. 14, 2017

(65) Prior Publication Data

US 2018/0297207 A1    Oct. 18, 2018

(51) Int. Cl.
| | |
|---|---|
| *G06F 19/00* | (2018.01) |
| *G06T 7/73* | (2017.01) |
| *G05D 1/02* | (2020.01) |
| *G06K 9/00* | (2006.01) |
| *G06K 9/62* | (2006.01) |

(52) U.S. Cl.
CPC ............. *G06T 7/73* (2017.01); *G05D 1/027* (2013.01); *G05D 1/0246* (2013.01); *G06K 9/00664* (2013.01); *G06K 9/6211* (2013.01); *G05D 2201/0203* (2013.01); *G06T 2207/30244* (2013.01); *Y10S 901/01* (2013.01)

(58) Field of Classification Search
CPC ..... B25J 9/1697; B25J 9/1664; G05D 1/0246; G05D 1/0272; G06K 9/4604; G06T 1/0014; G06T 7/73; Y10S 901/01
USPC .................................................. 700/245, 259
See application file for complete search history.

(56) References Cited

U.S. PATENT DOCUMENTS

| | | | | |
|---|---|---|---|---|
| 5,051,906 | A * | 9/1991 | Evans, Jr. ................ | G01S 5/16 180/169 |
| 8,385,971 | B2 * | 2/2013 | Rhoads ............ | G06F 17/30244 455/556.1 |
| 9,720,934 | B1 * | 8/2017 | Dube ................. | G06K 9/00805 |
| 2004/0133927 | A1 * | 7/2004 | Sternberg .......... | G06F 17/30247 725/136 |
| 2005/0213082 | A1 * | 9/2005 | DiBernardo ............ | G01S 5/163 356/139.03 |
| 2006/0074532 | A1 * | 4/2006 | Hong ................... | G05D 1/0231 701/28 |
| 2007/0086624 | A1 * | 4/2007 | Breed ................ | G06K 9/00362 382/104 |

(Continued)

*Primary Examiner* — Ronnie M Mancho
(74) *Attorney, Agent, or Firm* — Cooper Legal Group, LLC

(57) ABSTRACT

The present invention discloses a visual positioning and navigation device, comprising: a motion module, configured to drive a robot accordingly, and acquire a current pose information of the robot in real time; a camera module, configured to capture an environmental image during the movement of the robot; an image processing module, configured to perform the feature extraction and the feature description for the environmental image; and a pose estimation module, configured to match the feature point description of the environmental image, build a feature database, calculate the pose correction of the robot, and obtain the corrected robot pose based on the robot current pose and the pose correction. The visual positioning and navigation device and method thereof can build the scene map by detecting and tracking the feature information of the ORB feature points of the indoor ceiling, so as to achieve the accurate positioning and navigation of the robot.

12 Claims, 3 Drawing Sheets

(56) References Cited

U.S. PATENT DOCUMENTS

| | | | |
|---|---|---|---|
| 2011/0034176 A1* | 2/2011 | Lord | G06F 17/30244 |
| | | | 455/450 |
| 2011/0143811 A1* | 6/2011 | Rodriguez | G06K 9/00986 |
| | | | 455/556.1 |
| 2011/0212717 A1* | 9/2011 | Rhoads | G06F 17/30241 |
| | | | 455/420 |
| 2014/0079297 A1* | 3/2014 | Tadayon | G06K 9/00 |
| | | | 382/118 |
| 2014/0080428 A1* | 3/2014 | Rhoads | H04W 4/70 |
| | | | 455/88 |
| 2018/0268237 A1* | 9/2018 | Stanimirovic | G06K 9/2018 |

* cited by examiner

VISUAL POSITIONING AND NAVIGATION DEVICE AND METHOD THEREOF

TECHNICAL FIELD

Embodiments according to the present invention relate to the robot control field, especially relate to a visual positioning and navigation device based on ceiling feature point, and method thereof.

BACKGROUND

With the development of home automation, the cleaning robot is very popular. The present cleaning robot performs visual position and navigation based on infrared sensing and camera. The SLAM (Simultaneous Localization And Mapping) technology is very classical problem in the robot field, usually, the SLAM problem describes as: the robot moves from a unknown position in a unknown environment, the robot can position by itself based on pose estimation and map when it is in motion, and creates incremental map at same time on the basis of self localization and performs self-localization and navigation of the robot. The VSLAM (Visual Simultaneous Localization and Mapping) technology indicates that performs self-localization and map creation based on visual technology of computer for robot positioning method by using visual system with informative and wide using area, but not unconventional navigation technology. The robot should perform self localization and map creation in real time to finish navigation.

However, for conventional VSLAM plan, there are not enough uniformly distributed features to ensure positioning and navigation accuracy as limited ceiling objections.

SUMMARY

In an embodiment, the present invention provides a visual positioning and navigation device, comprising: a motion module, configured to drive the robot accordingly, and acquire a current pose information of the robot in real time; a camera module comprising an image sensor that captures an environmental image during the movement of the robot; an image processing module, configured to perform the feature extraction and the feature description for the environmental image; and a pose estimation module, configured to match the feature point description of the environmental image, build a feature database, calculate the pose correction of the robot, and obtain the corrected robot pose based on the robot current pose and the pose correction.

In another embodiment, the present invention also provides a visual positioning and navigation method, comprising: drive the robot accordingly, and acquire a current pose information of the robot in real time; capture an environmental image during the movement of the robot; perform the feature extraction and the feature description for the environmental image; and match the feature point description of the environmental image, build a feature database, calculate the pose correction of the robot, and obtain the corrected robot pose based on the robot current pose and the pose correction.

Advantageously, the scene map can be built based on feature information of ORB (oriented fast and rotated brief) feature point obtained by detecting and tracking indoor ceiling, in accordance with the visual positioning and navigation device and method thereof disclosed in present invention, and the visual positioning and navigation device is configured to position precisely and path planning of the robot.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
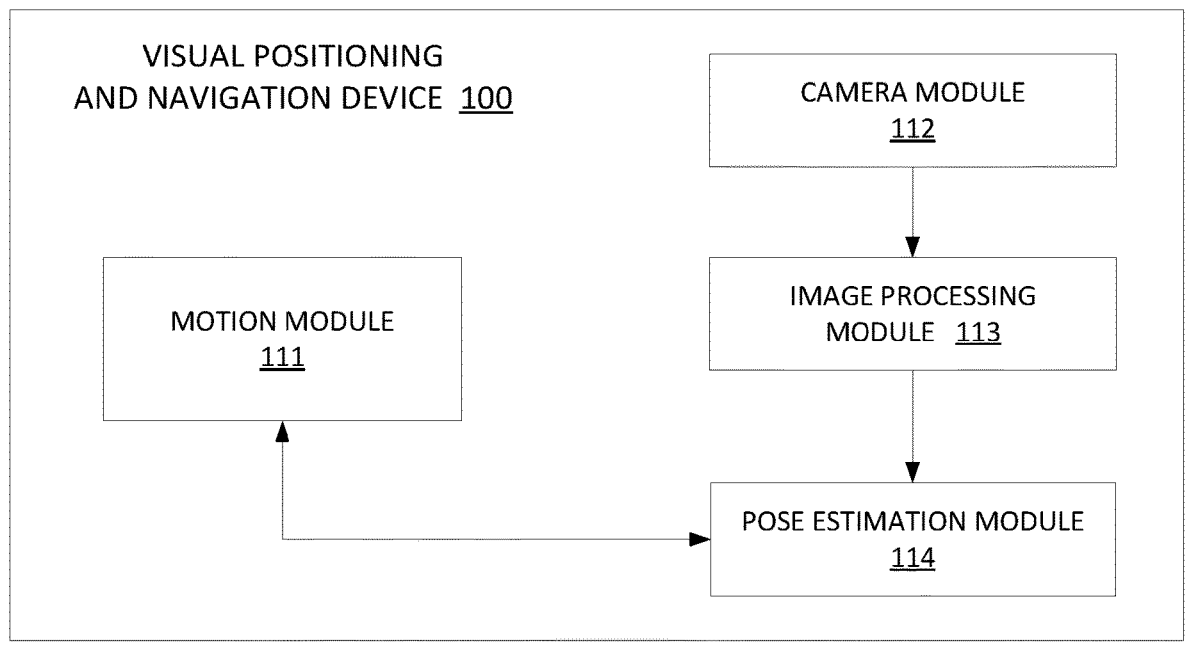
FIG. 1 illustrates a block diagram of a visual positioning and navigation device, in an embodiment according to the present invention.
Figure 2:
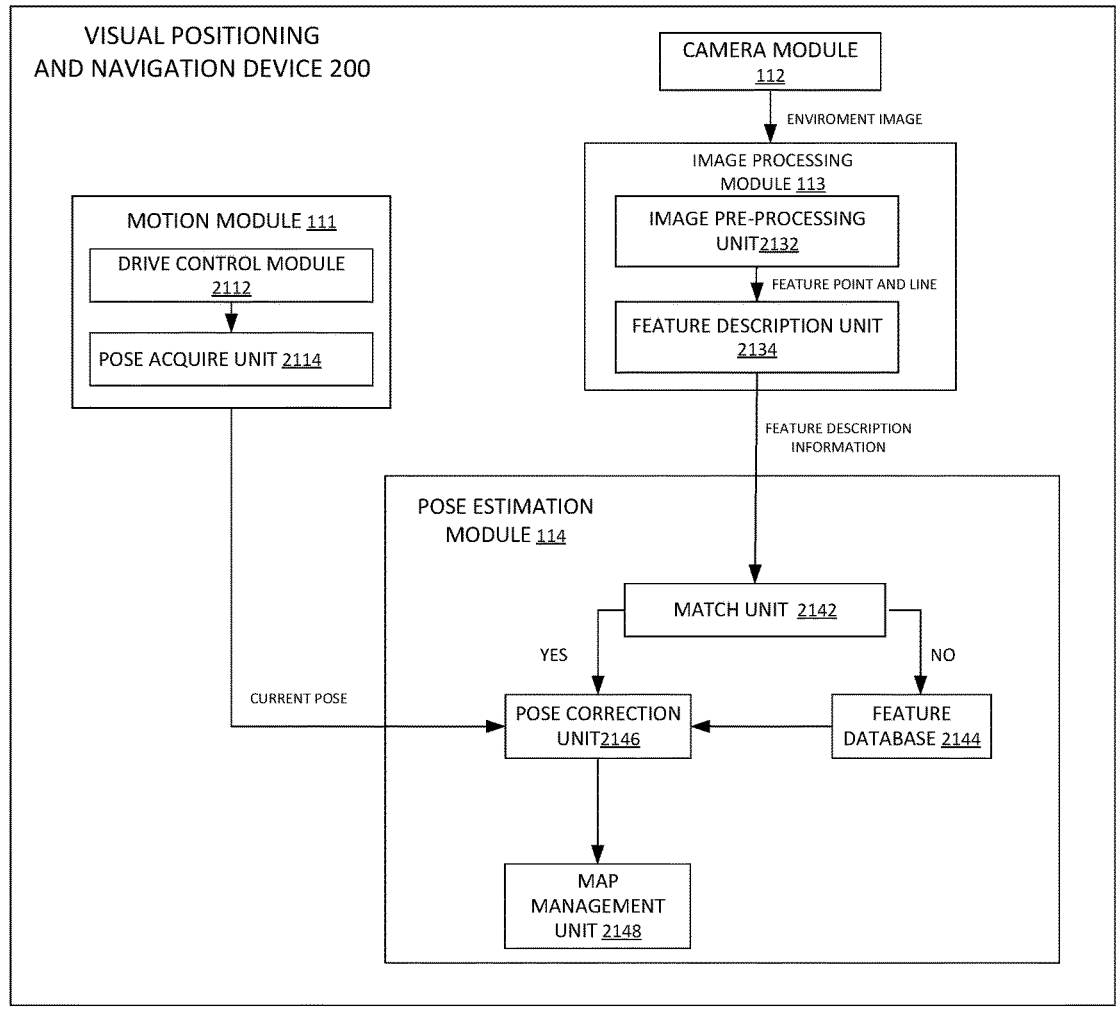
FIG. 2 illustrates a detailed block diagram of a visual positioning and navigation device, in an embodiment according to the present invention.

FIG. 1 illustrates a block diagram of a visual positioning and navigation device 100, in an embodiment according to the present invention. As shown in FIG. 1, the visual positioning and navigation device$_{100}$ includes: a motion module 111, a camera module 112, an image processing module 113 and pose estimation module 114. FIG. 2 illustrates a detailed block diagram of a visual positioning and navigation device 200, in an embodiment according to the present invention.

Combining FIG. 1 with FIG. 2, the motion module 111 is configured to drive the robot accordingly (i.e., drive control module 2112), and acquire a current pose information of the robot in real time (i.e., pose acquire unit 2114). Each of the modules may optionally be implemented as logic that includes hardware, a non-transitory computer-readable medium with stored instructions, firmware, and/or combinations thereof. For embodiments where the logic is implemented in stored instructions and/or firmware, a processor can be provided to execute such instructions to cause the present visual positioning and navigation device to perform the methods described herein. The processor can be any of a variety of various processors including dual microprocessor and other multi-processor architectures. A computer-readable memory can be provided to store such instructions that are executeable by the processor. Illustrative examples of the memory may include volatile memory and/or non-volatile memory. More specifically, examples of non-volatile memory may include, for example, ROM, PROM, a magnetic disk drive, a solid state disk drive, a Zip drive, a flash memory card, a memory stick, and so on. Examples of volatile memory may include, for example, RAM, SRAM, DRAM, and so on. For example, a gyroscope in the pose acquire unit 2114 obtains a current deflection angle θ of the robot, and the photoelectric pulse counter installed on the robot wheel can direct a beam of light onto a portion of the wheel to detect wheel rotations and obtain a movement distanced of the robot. According to alternate embodiments, any other suitable sensor(s) in addition to, or instead of the gyroscope and/or the photoelectric pulse counter can be utilized to determine the current deflection angle θ of the robot and a movement distance of the robot based on revolutions of the robot wheel. For the sake of brevity and clarity, the present positioning and navigation device and method will be described with reference to the illustrative embodiments utilizing the gyroscope and the photoelectric pulse counter. The initial position and angle of the robot is set as zero, and the robot current pose estimation can be obtained by one or more processors by using the equation as below with gradual accumulation:

$R_{θ2} = R_{θ1} + θ;$ $R_{x2} = R_{x1} + d*\cos(θ);$ and $R_{y2} = R_{y1} + d*\sin(θ),$ and where $R_{θ2}$ is an angle in a polar coordinate system of the robot in a current pose, $R_{θ1}$ is an angle in the polar coordinate system of the robot in a previous pose (e.g., the initial position), $R_{x2}$ is an x-component in the polar coordinate system of the robot in the current pose, $R_{x1}$ is an x-component in the polar coordinate system of the robot in the previous pose, $R_{y2}$ is a y-component in the polar coordinate system of the robot in the current pose, $R_{y1}$ is a y-component in the polar coordinate system of the robot in the previous pose.

The camera module 112 can include any suitable image sensor such as a complementary metal-oxide-semiconductor (CMOS) sensor, charge-coupled device (CCD), or any other suitable sensor, can be located above the visual positioning and navigation device 100 (for example, the robot), is configured to capture environmental image in the movement, for example, ceiling photo.

The image processing module 113 is coupled to the camera module 112, is configured to perform feature extraction and feature description for the environmental image, i.e., remove effect on the feature description caused as lens distortion by pre-processing the environmental image (processed by the image pre-processing unit 2132), and extract feature point of the environmental image, and performs multidimensional description for the feature point by using ORB (oriented fast and rotated brief) feature point detection method (performed by feature description unit 2134).

The pose estimation module 114 is coupled to the image processing module 113, is configured to match the feature point description of the environmental image based on multidimensional description of multiple feature points (performed by match unit 2142), build feature database (performed by feature database 2144), calculate pose correction of the robot, and obtain the corrected robot pose (performed by the pose correction unit 2146) based on the current pose and the pose correction of the robot. Moreover, the pose estimation module 114 further includes a map management unit 2148. The map management unit 2148 obtains the corrected robot pose to build map of the current environment.

Figure 3:
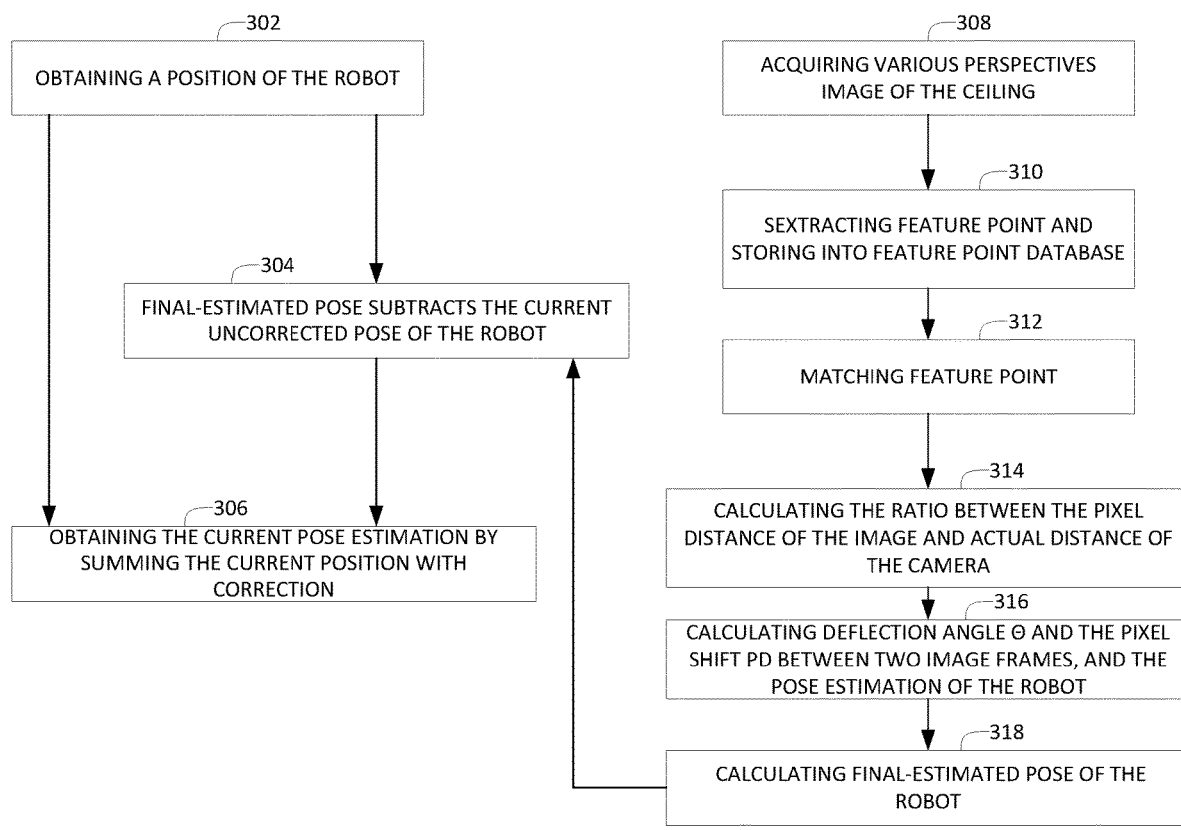
FIG. 3 illustrates a flowchart of a method of visual positioning and navigation, in an embodiment according to the present invention.

FIG. 3 illustrates a flowchart of a method of visual positioning and navigation, in an embodiment according to the present invention. The method includes steps as below.

Step 308: the camera module of the cleaning robot shots ceiling during the movement, and acquire various perspectives image of the ceiling, and transform the shoot ceiling video to the image processing module for processing.

Step 310: the feature extraction in the image processing module is obtained by extracting image midpoint feature, and by using method of OpenCV with ORB feature extraction. The method possesses many merits, such as fast calculation speed, anti noise and anti rotation. After processing the image by using ORB feature extraction method, and obtain a series of feature point data, and store the feature information into feature database. The feature database is configured to store data corresponding to analyzed image frame, in which each data keeps information as below:

(1) the current pose of the robot when acquires the image frame.

(2) the index number of the feature point in the image.

(3) the position of the feature point in the image (4) the description of the feature in the image In the feature database, each stored data satisfies a certain condition, and the minimum distance between the position of the robot recorded in each data is greater than 10 cm. Accordingly, the database size does not increase indefinitely when the robot moves repeatedly within a certain area.

Step 312: during performing VSLAM position in real time, the acquired feature point description information of the current image is matched with the built database. Specifically, when the description information of the feature point is matched with the built database, use the Euclidean distance as similarity measurement of the feature points, set a threshold, and obtain the matched feature points between two image frames. If the match unit indicates that the current environmental image is in the feature database, then performs next pose correction step. If not, the current environmental image is stored into feature database.

Step 314: before calculating the pose correction of the robot, the pose correction unit calculates the ratio between the pixel distance of the image and actual distance of the camera. For example, the height of the ceiling covers a area that circle with the position of the robot as center point, and the radius of one meter, is assumed as same. As the robot uses a vertical view camera, if the image distortion is corrected, the ratio between the pixel distance of the image and actual distance of the camera is identified as a fix level when the internal parameter in the camera is maintained at a fixed level. The above fixed level is assumed as parameter k, this parameter k is calculated by matched data in the feature database. First, the feature point of the current frame F is matched with feature database, for the matched frame Fr1, Fr2, the shifted distance d (Fr1, Fr2) between two set of data can be calculated according to the position of the robot recorded in the data, and pixel shift pd (Fr1, Fr2) between two image frame can be calculated according to the feature point information recorded in the two set of data.

The affine transformation of the matched point in the image can be calculated as below:

$$[A^* | b^*] = \operatorname*{argmin}_{[A|b]} \sum_i \|dst[i] - Asrc[i]^T - b\|^2$$

src[i] and dst[i] represent the ith point in the matched point, [A|b] indicates $$\begin{bmatrix} a_{11} & a_{12} & b_1 \\ -a_{12} & a_{11} & b_2 \end{bmatrix}.$$

The affine transformation matrix [U, S, V]=SV D(H) is decomposed by using SVD $$R=VU^T$$

$$t=-R \times \text{centroid}_A + \text{centroid}_B$$

wherein centroidA and centroidB represent as the circle of the image. The shift transformation dx, dy and the rotation transformation dth of the matched point of the image can be obtained.

Accordingly, for the set of data, k is calculated based on equation as below:

$$k=d(Fr1,Fr2)/pd(Fr1,Fr2).$$

Then, the shift transformation and rotation transformation of Fr1, Fr2 of F against the position of the robot can be calculated based on the equations as below:

Movement1=$k$*sqrt($Fr1.dx*Fr1.dx+Fr1.dy*Fr1.dy$)

Movement2=$k$*sqrt($Fr1.dx*Fr1.dx+Fr1.dy*Fr1.dy$)

Angle1=mean($Fr1.angle,Fr1.angle+Fr1.dth$)

Angle2=mean($Fr2.angle,Fr2.angle+Fr2.dth$)

Such that, for each data, there are two set of pose estimations of the camera can be calculated. In the database, each two data can be used to calculate, then multiple pose estimation corresponding to the current image frame can be obtained. These pose estimations will be filtered to calculate the average, and remove large deviation result. Finally, the final-estimated pose of the robot can be obtained by using a k-means clustering method.

Step 316: After acquiring the ratio k between the pixel distance between two images and actual distance of the camera module, a set of feature data Dn of around position of the robot will be subtracted successively. The reliable feature point couple will be subtracted by matching calculation for feature point between TD and Dn. The deflection angle θ and the pixel shift pd between two image frames can be calculated by using these feature point, and further the pose of the robot is stored in data Dn. Combining parameter k acquired at step 312, a set of estimated poses of the robot can be calculated according to equations as below:

$$R_\theta = D_\theta + \theta;$$

$$R_x = D_x + p_d * k * \cos(R_\theta);$$

$$R_y = D_y + p_d * k * \sin(R_\theta),$$

where $D_x$ is an x-component in a polar coordinate system of the robot in a current pose, $D_y$ is a y-component in the polar coordinate system of the robot in the current pose, and $D_\theta$ is an angle in the polar coordinate system of the robot in the current pose of the robot, and where $R_\theta$ is an angle in the polar coordinate system of the robot in the estimated current pose, $R_x$ is an x-component in the polar coordinate system of the robot in the estimated current pose, and $R_y$ is a y-component in the polar coordinate system of the robot in the estimated current pose.

Specifically, a pose estimation can be performed between each data in the database and current image obtained by the robot, and multiple current pose estimation of the robot can be obtained. The final-estimated pose of the robot can be calculated by using the k-means clustering method (step 318). The final-estimated pose subtracts the current uncorrected pose of the robot to obtain pose correction of the robot (step 304).

Step 306: considering that there is certain delay of the obtained image, the outputted data is pose correction, but not pose data itself. Thus, even if a short time image delays, the pose correction exerts effective correction. When the outputted pose correction is acquired at step 314, the correction is added into the current pose to obtain corrected pose. The corrected pose is used to motion control and path planning.

Moreover, step 302 can be included between step 304 and step 306. A current deflection angle θ of the robot is obtained by a gyroscope, and a movement distance d of the robot is obtained by a photoelectric pulse counter on the robot wheel. The initial position and angle of the robot is assumed as zero, the current pose (Rx, Ry, Rth) estimation of the robot can be obtained by gradual accumulation based on the equations as below:

$$R_{\theta 2} = R_{\theta 1} + \theta;$$

$$R_{x2} = R_{x1} + d * \cos(\theta); \text{ and}$$

$$R_{y2} = R_{y1} + d * \sin(\theta), \text{ and}$$

where $R_{\theta 2}$ is an angle in a polar coordinate system of the robot in a current pose, $R_{\theta 1}$ is an angle in the polar coordinate system of the robot in a previous pose (e.g., the initial position), $R_{x2}$ is an x-component in the polar coordinate system of the robot in the current pose, $R_{x1}$ is an x-component in the polar coordinate system of the robot in the previous pose, $R_{y2}$ is a y-component in the polar coordinate system of the robot in the current pose, and $Ry_1$ is a y-component in the polar coordinate system of the robot in the previous pose.

Advantageously, the scene map can be built based on feature information of ORB feature point obtained by detecting and tracking indoor ceiling, in accordance with the visual positioning and navigation device and method thereof disclosed in present invention, and the visual positioning and navigation device is configured to position precisely and path planning of the robot.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. A visual positioning and navigation device, comprising:
   a motion module, configured to drive a robot and acquire current pose information of the robot in real time;
   a camera module comprising an image sensor that captures an environmental image during movement of the robot, wherein the camera module is mounted on top of the robot, and wherein the environment image is a ceiling photo;

an image processing module, configured to perform feature extraction and feature description for the environmental image captured by the image sensor of the camera module; and a pose estimation module, configured to build a feature database comprising a plurality of features and compare the feature description of the environmental image to the features in the feature database, calculate a pose correction of the robot, and obtain a corrected robot pose based on the current pose information and the pose correction, wherein the motion module is configured to obtain a deflection angle θ of the robot by a gyroscope, and obtain a movement distance d of the robot by a photoelectric pulse counter on a wheel of the robot, wherein the current pose information of the robot is calculated by the equation set:

$R_{\theta 2}=R_{\theta 1}+\theta$;

$R_{x2}=R_{x1}+d^{*}\cos(\theta)$; and $R_{y2}=R_{y1}+d^{*}\sin(\theta)$, and wherein $R_{\theta 2}$ is an angle in a polar coordinate system of the robot in a current pose, $R_{\theta 1}$ is an angle in the polar coordinate system of the robot in a previous pose, $R_{x2}$ is an x-component in the polar coordinate system of the robot in the current pose, $R_{x1}$ is an x-component in the polar coordinate system of the robot in the previous pose, $R_{y2}$ is a y-component in the polar coordinate system of the robot in the current pose, $R_{y1}$ is a y-component in the polar coordinate system of the robot in the previous pose.

2. The visual positioning and navigation device according to claim 1, wherein the image processing module comprises:
an image pre-processing unit, configured to pre-process the environmental image to remove a lens distortion effect; and
a feature description unit, configured to use an oriented fast and rotated brief (ORB) feature point detection method to extract feature points in the environmental image and prepare a description of the feature points.

3. The visual positioning and navigation device according to claim 1, wherein the pose estimation module comprises:
a match unit, configured to compare the feature description of the environmental image with the features in the feature database, wherein when the feature description of the environmental image does not match at least one of the features in the feature database, related data of the environmental image is added into the feature database; and
a pose correction unit, configured to calculate the pose correction of the robot when the match unit indicates that the feature description of the environmental image matches at least one of the features in the feature database, and to obtain the corrected robot pose based on the current pose information and the pose correction.

4. The visual positioning and navigation device according to claim 3, wherein the match unit is configured to use a Euclidean distance as a similarity measurement of feature points, and obtain matched feature points between two image frames.

5. The visual positioning and navigation device according to claim 3, wherein the pose correction unit is configured to:
calculate a ratio between a pixel distance between two image frames and an actual distance of the camera module catching the two image frames;

for the deflection angle θ and a pixel shift $p_d$ between the two image frames, calculate an estimated current pose of the robot;
use a k-means clustering method to calculate a final-estimated pose of the robot;
subtract the final-estimated pose from the current pose information of the robot, to obtain the pose correction of the robot; and
add the current pose information and the pose correction, to obtain the corrected robot pose.

6. The visual positioning and navigation device according to claim 5, wherein the pose correction unit is configured to calculate the estimated current pose of the robot by the equation set:

$R_{\theta}=R_{\theta 2}+\theta$;

$R_x=R_{x2}+p_d{*}k{*}\cos(R_\theta)$; and $R_y=R_{y2}p_d{*}k{*}\sin(R_\theta)$, wherein k represents the ratio between the pixel distance between the two image frames and the actual distance of the camera module, wherein $R_\theta$ is an angle in the polar coordinate system of the robot in the estimated current pose, $R_x$ is an x-component in the polar coordinate system of the robot in the estimated current pose, and $R_y$ is a y-component in the polar coordinate system of the robot in the estimated current pose.

7. A visual positioning and navigation method, comprising
driving a robot and acquiring current pose information of the robot in real time during the driving;
capturing an environmental image during movement of the robot, wherein the environmental image is a ceiling photo;
performing feature extraction and feature description for the environmental image captured;
building a feature database comprising a plurality of features; and
comparing the feature description of the environmental image to the features in the feature database that was built, calculating a pose correction of the robot, and obtaining a corrected robot pose based on the current pose information and the pose correction,
wherein the step of acquiring the current pose information of the robot in real time comprises:
obtaining a deflection angle θ of the robot by a gyroscope, and obtaining a movement distance d of the robot by a photoelectric pulse counter on a wheel of the robot, wherein the current pose information of the robot is calculated by the equation set:

$R_{\theta 2}=R_{\theta 1}+\theta$;

$R_{x2}=R_{x1}+d^{*}\cos(\theta)$; and $R_{y2}=R_{y1}+d^{*}\sin(\theta)$, and wherein $R_{\theta 2}$ is an angle in a polar coordinate system of the robot in a current pose, $R_{\theta 1}$ is an angle in the polar coordinate system of the robot in a previous pose, $R_{x2}$ is an x-component in the polar coordinate system of the robot in the current pose, $R_{x1}$ is an x-component in the polar coordinate system of the robot in the previous pose, is a y-component in the polar coordinate system of the robot in the current pose, and $R_{y1}$ is a y-component in the polar coordinate system of the robot in the previous pose.

8. The visual positioning and navigation method according to claim 7, wherein the step of performing the feature extraction and the feature description for the environmental image comprises:
   pre-processing the environmental image before performing the feature extraction and the feature description to remove a lens distortion effect; and
   using an oriented fast and rotated brief (ORB) feature point detection method to extract feature points in the environmental image and prepare a description of the feature points.

9. The visual positioning and navigation method according to claim 7, wherein the step of comparing the feature description of the environmental image to the features in the feature database, calculating the pose correction of the robot, and obtaining the corrected robot pose based on the current pose information and the pose correction comprises:
   when the feature description of the environmental image does not match at least one of the features in the feature database, adding related data of the environmental image into the feature database;
   calculating the pose correction of the robot when the feature description of the environmental image matches at least one of the features in the feature database; and
   obtaining the corrected robot pose based on the current pose information and the pose correction.

10. The visual positioning and navigation method according to claim 9, wherein the step of comparing the feature description of the environmental image comprises:
    using a Euclidean distance as a similarity measurement of feature points, and
    obtaining matched feature points between two image frames.

11. The visual positioning and navigation method according to claim 9, wherein the step of obtaining the corrected robot pose based on the current pose information and the pose correction comprises:
    calculating a ratio between a pixel distance between two image frames and an actual distance of a camera module catching the two image frames;
    for the deflection angle θ and a pixel shift $p_d$ between the two image frames, calculating an estimated current pose of the robot;
    using a k-means clustering method to calculate a final-estimated pose of the robot;
    subtracting the final-estimated pose from the current pose information of the robot, to obtain the pose correction of the robot; and
    adding the current pose information and the pose correction, to obtain the corrected robot pose.

12. The visual positioning and navigation method according to claim 11, wherein the step of calculating the estimated current pose of the robot comprises: calculating the estimated current pose of the robot by the equation set:

$$R_\theta = R_{\theta 2} + \theta;$$

$$R_x = R_{x2} p_d * k * \cos(R_\theta); \text{ and}$$

$$R_y = R_{y2} p_d * k * \sin(R_\theta),$$

wherein k represents the ratio between the pixel distance between the two image frames and the actual distance of the camera module, wherein $R_\theta$ is an angle in the polar coordinate system of the robot in the estimated current pose, $R_x$ is an x-component in the polar coordinate system of the robot in the estimated current pose, and $R_y$ is a y-component in the polar coordinate system of the robot in the estimated current pose.

* * * * *